United States Patent
Lee (10) Patent No.: US 7,668,413 B2
(45) Date of Patent: Feb. 23, 2010

(54) APPARATUS AND METHOD FOR MEASURING CONVERGENCE USING FIBER BRAGG GRATING SENSOR

(76) Inventor: Geumsuk Lee, Seongju 4-beonjl, Seongju-myeon, Boryeong-si, Chungcheongnam-do (KR) 355-910

( * ) Notice: Subject to any disclaimer, the term of this patent is extended or adjusted under 35 U.S.C. 154(b) by 0 days.

(21) Appl. No.: 12/367,717

(22) Filed: Feb. 9, 2009

(65) Prior Publication Data

US 2009/0185773 A1 Jul. 23, 2009

Related U.S. Application Data

(63) Continuation-in-part of application No. PCT/KR2007/000235, filed on Jan. 15, 2007.

(30) Foreign Application Priority Data

Aug. 9, 2006 (KR) ............... 10-2006-0075423
Sep. 15, 2006 (KR) ............... 10-2006-0089839

(51) Int. Cl.
*G02B 6/00* (2006.01)
*G02B 6/34* (2006.01)
(52) U.S. Cl. ............... 385/12; 385/13; 385/37; 250/227.11
(58) Field of Classification Search ............... 385/12, 385/13, 37; 250/227.11
See application file for complete search history.

(56) References Cited

U.S. PATENT DOCUMENTS 5,680,489 A * 10/1997 Kersey .................. 385/12
6,320,992 B1 * 11/2001 Goldner et al. .......... 385/13

* cited by examiner

*Primary Examiner*—Frank G Font
*Assistant Examiner*—Mary A El Shammaa
(74) *Attorney, Agent, or Firm*—Jae Y. Park; Kile Goekjian Reed & McManus PLLC (57) ABSTRACT

Disclosed is an apparatus for measuring convergence using a fiber Bragg grating sensor measuring slight deformation, capable of measuring the convergence such as the inclination or the gravitational acceleration of a measurement target including a bridge or a tunnel by measuring the deformation of the fiber Bragg grating sensor when the measurement target is inclined or vibrated, as well as a measurement method using the apparatus. The apparatus includes a main body that is installed on a measurement target; a fixture that is fixedly installed at the front of the main body; a rotator that is horizontally installed apart from the fixture at a predetermined distance and is rotatably installed in the main body using a bearing; an optical fiber that is adhered to upper outer surfaces of the fixture and the rotator so as to maintain a horizontally tensioned state and has optical terminals installed on opposite ends thereof; a fiber Bragg grating sensor that is installed on the optical fiber between the fixture and the rotator; and a bob that is vertically connected with a lower portion of the rotator by a support having a predetermined length. The apparatus is installed on the measurement target after setting a reference value and then calculates a quantity of displacement caused by variation of the ground, so that values of angular displacement and gravitational acceleration displacement are measured.

11 Claims, 9 Drawing Sheets

APPARATUS AND METHOD FOR MEASURING CONVERGENCE USING FIBER BRAGG GRATING SENSOR

This application is a continuation-in-part of International Application No. PCT/KR2007/000235, filed Jan. 7, 2007, which was published in English as WO 2008/018665 A1, and which claims priority to Korean Application No. 10-2006-0089839, filed Sep. 15, 2006, and to Korean Application No. 10-2006-0075423, filed Aug. 9, 2006. All of the above applications are incorporated herein by reference in their entireties.

TECHNICAL FIELD

The present invention relates to an apparatus and method for measuring convergence using a fiber Bragg grating sensor. More particularly, the present invention relates to an apparatus for measuring convergence using a fiber Bragg grating sensor measuring slight deformation, capable of measuring the convergence such as the inclination or the gravitational acceleration of a measurement target including a bridge or a tunnel by measuring the deformation of the fiber Bragg grating sensor when the measurement target is inclined or vibrated, and a measurement method using the apparatus.

BACKGROUND ART

In general, the tunnels for subway have a possibility to cause deformation due to shocks propagated above the ground or vibrations and noises generated while the subway is operated. Thus, the tunnels are required for periodical measurement of convergence.

In the tunnels, the measurement of convergence is used to measure the behavior of an inner cross section of the tunnel to determine whether or not the tunnel is stable, and mainly includes the measurement of an inclination of the tunnel or gravitational acceleration caused by noises and vibrations.

Conventionally, the tunnel convergence is measured using an electric resistance gauge. However, this measurement has low precision, and is difficult to provide a reliable measurement value due to the influence of electromagnetic waves, particularly, while the subway is operated, so that it is not carried out in real time, and thus is performed after the operation of the subway is completed.

However, considering that the tunnel convergence is considerably subject to the physical influence of operation speed and load of the subway, the fact that the measurement cannot be performed while the subway is operated is regarded as a big problem.

DISCLOSURE

Technical Problem

The present invention has been made to solve the above problem occurring in the prior art, and an object of the present invention is to provide an apparatus for measuring convergence using a fiber Bragg grating sensor, which is installed on a measurement target such as a tunnel for a subway, and is not subject to the influence of electromagnetic waves so as to perform measurement anytime regardless of operation of the subway, thereby making more precise measurement possible.

Technical Solution

In order to accomplish the object, according to one aspect of the present invention, there is provided an apparatus for measuring convergence using a fiber Bragg grating sensor, being installed on a measurement target and thereby making it possible to measure a value of angular displacement caused by deformation of the measurement target. The apparatus includes: a main body that is installed on the measurement target; a posture corrector that is installed at the front of the main body and rotates in cooperation with an inclination of the main body; a fixture that is fixedly installed at the front of the main body; a rotator that is horizontally installed apart from the fixture at a predetermined distance and is rotatably installed in the main body using a bearing; an optical fiber that is adhered to upper outer surfaces of the fixture and the rotator so as to maintain a horizontally tensioned state; a fiber Bragg grating sensor that is installed on the optical fiber between the fixture and the rotator; and a bob that is vertically connected with a lower portion of the rotator by means of a support having a predetermined length.

According to another aspect of the present invention, there is provided an apparatus for measuring convergence using a fiber Bragg grating sensor, being installed on a measurement target, and thereby making it possible to measure a variation value of gravitational acceleration caused by deformation. The apparatus includes: a main body that is installed on the measurement target; a fixture that is fixedly installed at the front of the main body; a rotator that is horizontally installed apart from the fixture at a predetermined distance and is rotatably installed in the main body using a bearing; upper and lower optical fibers that are adhered to upper and lower outer surfaces of the fixture and the rotator so as to maintain a horizontally tensioned state; a fiber Bragg grating sensor that is installed on the upper optical fiber between the fixture and the upper outer surface of the rotator; and a bob that is vertically connected with a lower portion of the rotator by means of a support having a predetermined length.

According to yet another aspect of the present invention, there is provided a measurement method using a convergence measurement apparatus having a main body that is installed on a measurement target; a fixture that is fixedly installed at the front of the main body; a rotator that is horizontally installed apart from the fixture at a predetermined distance and is rotatably installed in the main body using a bearing; an optical fiber that is adhered to upper outer surfaces of the fixture and the rotator so as to maintain a horizontally tensioned state and has optical terminals installed on opposite ends thereof; a fiber Bragg grating sensor that is installed on the optical fiber between the fixture and the rotator; and a bob that is vertically connected with a lower portion of the rotator by means of a support having a predetermined length. The measurement method includes: a first step of measuring a quantity of wavelength displacement of the fiber Bragg grating sensor to set the quantity of wavelength displacement as a reference value; a second step of installing the main body to the measurement target; a third step of measuring a value of the wavelength displacement resulting from expansion and contraction of the fiber Bragg grating sensor by means of rotation of the bob cooperating with an inclination of the measurement target caused by variation of the ground; and a fourth step of substituting the wavelength displacement value measured in the third step into an equation to obtain angular displacement.

According to still yet another aspect of the present invention, there is provided a measurement method using a convergence measurement apparatus having a main body that is installed on a measurement target; a fixture that is fixedly installed at the front of the main body; a rotator that is horizontally installed apart from the fixture at a predetermined distance and is rotatably installed in the main body using a bearing; upper and lower optical fibers that are adhered to upper and lower outer surfaces of the fixture and the rotator so as to maintain a horizontally tensioned state and each have an optical terminal installed on one end thereof; a fiber Bragg grating sensor that is installed on the upper optical fiber between the fixture and the upper outer surface of the rotator; and a bob that is vertically connected with a lower portion of the rotator by means of a support having a predetermined length. The measurement method includes: a first step of rotating the main body up to 90 degrees in a counterclockwise direction to contract the upper optical fiber and simultaneously extend the lower optical fiber by means of rotation of the bob; a second step of measuring a quantity of wavelength displacement of the fiber Bragg grating sensor in the first step to set the quantity of wavelength displacement as a reference value of gravitational acceleration; a third step of rotating the main body up to 90 degrees in a clockwise direction to cause the bob to return to its original position; a fourth step of installing the main body to a measurement target; a fifth step of measuring a value of the wavelength displacement of the fiber Bragg grating sensor by means of rotation of the bob cooperating with left-right vibration of the measurement target caused by variation of the ground; and a sixth step of substituting the wavelength displacement value measured in the fifth step S5 into an equation to obtain tensile force of the bob, and obtaining a varied gravitational acceleration by comparing the obtained the displacement quantity with the reference value of the third step.

BEST MODE

Hereinafter, exemplary embodiments according to the present invention will be described with reference to the accompanying drawings.

Figure 1:
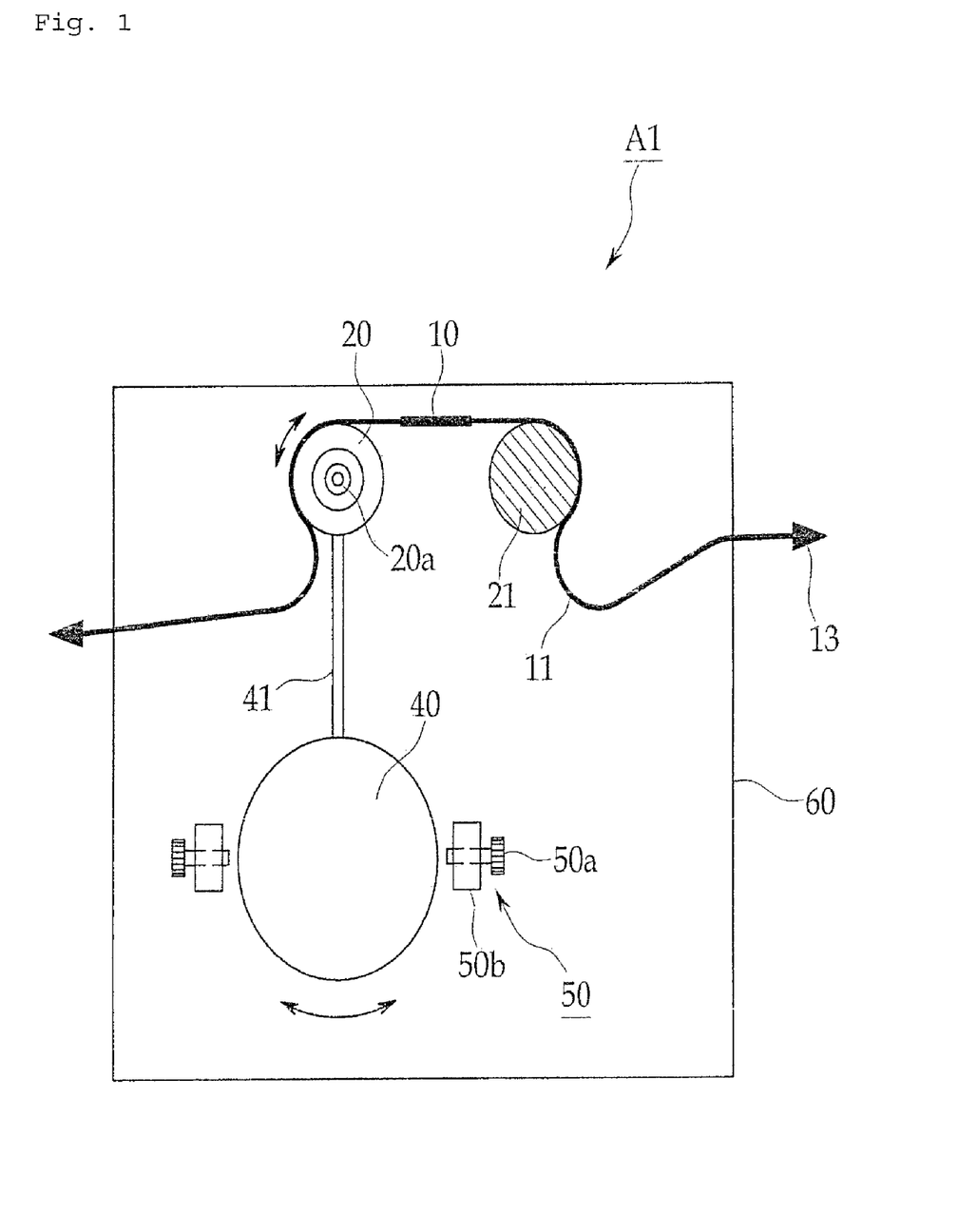
FIG. 1 is a view illustrating an apparatus for measuring convergence using a fiber Bragg grating sensor according to a first embodiment of the present invention.
Figure 4:
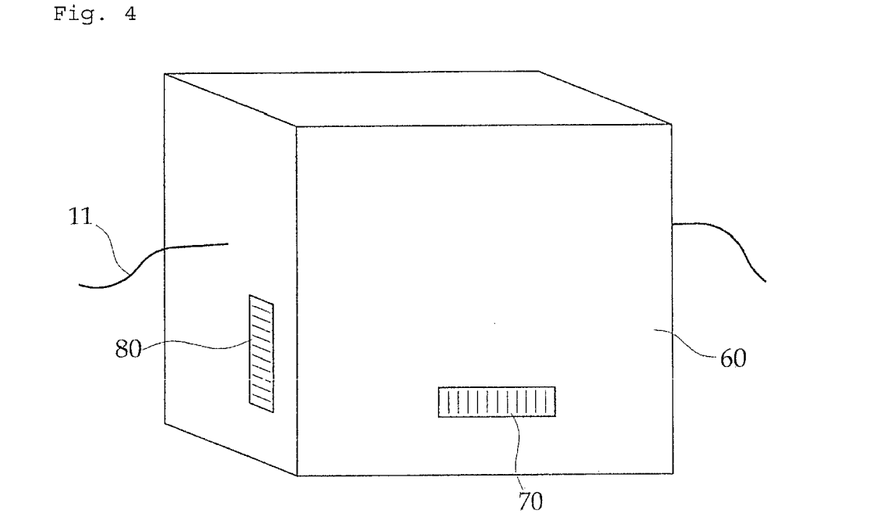
FIG. 4 illustrates the appearance of an apparatus for measuring convergence using a fiber Bragg grating sensor according to the present invention, wherein a horizontal meter is installed.

FIG. 1 is a view illustrating an apparatus for measuring convergence using a fiber Bragg grating sensor according to a first embodiment of the present invention. FIG. 4 illustrates the appearance of an apparatus for measuring convergence using a fiber Bragg grating sensor according to the present invention, wherein a horizontal meter is installed.

Referring to FIG. 1, an apparatus A1 for measuring convergence using a fiber Bragg grating sensor in accordance with a first embodiment of the present invention is installed on a measurement target, such as the wall of a tunnel, and thereby functions to measure a value of angular displacement caused by deformation of the measurement target. To this end, the apparatus A1 includes a main body 60 that is installed on the measurement target, a fixture 21 that is fixedly installed at the front of the main body 60, a rotator 20 that is horizontally installed apart from the fixture 21 at a predetermined distance and is rotatably installed in the main body 60 using a bearing, an optical fiber 11 that is adhered to upper outer surfaces of the fixture 21 and the rotator 20 so as to maintain a horizontally tensioned state and has optical terminals 13 installed on opposite ends thereof, a fiber Bragg grating sensor 10 that is installed on the optical fiber 11 between the fixture 21 and the rotator 20, and a bob 40 that is vertically connected with a lower portion of the rotator 20 by means of a support 41 having a predetermined length.

The main body 60 has the shape of a rectangular plate or a box in which a holding section is formed, and has a horizontal meter 70 and a vertical meter 80 installed outside thereof as illustrated in FIG. 4.

The fixture 21 or the rotator 20 preferably employs a circular wheel. The rotator 20 is coupled with a shaft 20a provided to the main body 60 using a bearing, thereby minimizing frictional force.

The fiber Bragg grating sensor 10 is called a fiber Bragg grating (FBG), in which the refractive index of a core varies periodically and selectively reflects only light of certain wavelengths (Bragg wavelengths).

Further, this fiber Bragg grating sensor 10 has the value of a specific wavelength, and is known to have very excellent physical properties, for instance to be hardly ever subject to the influence of electromagnetic waves.

Generally, this fiber Bragg grating sensor 10 has very high tensile force per unit area as well as a very small diameter of 125 μm, so that it can be easily broken by external shock, and thus requires very delicate work when adhered.

Further, when the fiber Bragg grating sensor 10 is installed so as to connect the outer surfaces of the fixture 21 and the rotator 20, it is tightly pulled and installed in a tensioned state so as to have proper tensile force, thereby allowing a more precise value to be measured.

A pair of displacement adjustors 50 for stopping movement of the bob 40 is installed on opposite sides of the bob 40 in order to restrict amplitude of the bob 40 or prevent breakage during carrying.

Each displacement adjuster 50 includes a body 50b that is spaced apart from the bob 40 by a predetermined distance, and an adjusting bolt 50a that is screwed into the body 50b and allows an end thereof to support the bob 40. The adjusting bolt 50a is screwed or unscrewed to restrict a space where the bob 40 can move.

The displacement adjustor 50 is applied to all apparatuses A2, A3 and A4 according to second, third and fourth embodiment of the present invention. Hereinafter, a description of the displacement adjustor 50 will not be repeated.

When the measurement target, to which the main body 60 is attached, is inclined, the main body 60 is also inclined together with the measurement target. The bob 40 is rotated in an opposite direction relative to the main body 60, because it is oriented to the center of the earth.

At this time, the rotator 20 connected with the bob 40 through the support 41 rotates to thereby stretch or contract the optical fiber 11. This displacement is detected by the fiber Bragg grating sensor 10.

Thus, because the magnitude of the rotating force generated by the bob 40 is varied in proportion to a rotating angle of the main body 60, the displacement is detected by the fiber Bragg grating sensor 10, and then can be calculated in terms of the angle.

Further, the adjusting bolts 50a of the displacement adjustors 50 installed on opposite sides of the bob 40 are screwed or unscrewed, thereby restricting the amplitude of the bob 40.

In this manner, because the unnecessary displacement of the bob 40 is prevented in advance, the durability of the fiber Bragg grating sensor 10 is prevented from being lowered. For the carrying, the adjusting bolts 50a are further screwed to fix the bob 40 in close contact with the bob 40, so that the breakage of the fiber Bragg grating sensor 10 is prevented.

The adjusting bolts 50a are preferably installed such that a user can manipulate it outside the main body 60.

Meanwhile, a fiber Bragg grating sensor (not shown) for compensating for the temperature is installed on the main body 60 to detect deformation of the main body 60 according to the temperature. The compensation of a measured value realizes more precise measurement. As illustrated in FIG. 4, the horizontal meter 70 or the vertical meter 80 is installed outside the main body 60 on an x axis or a y axis, thereby facilitating the installation work.

Figure 2:
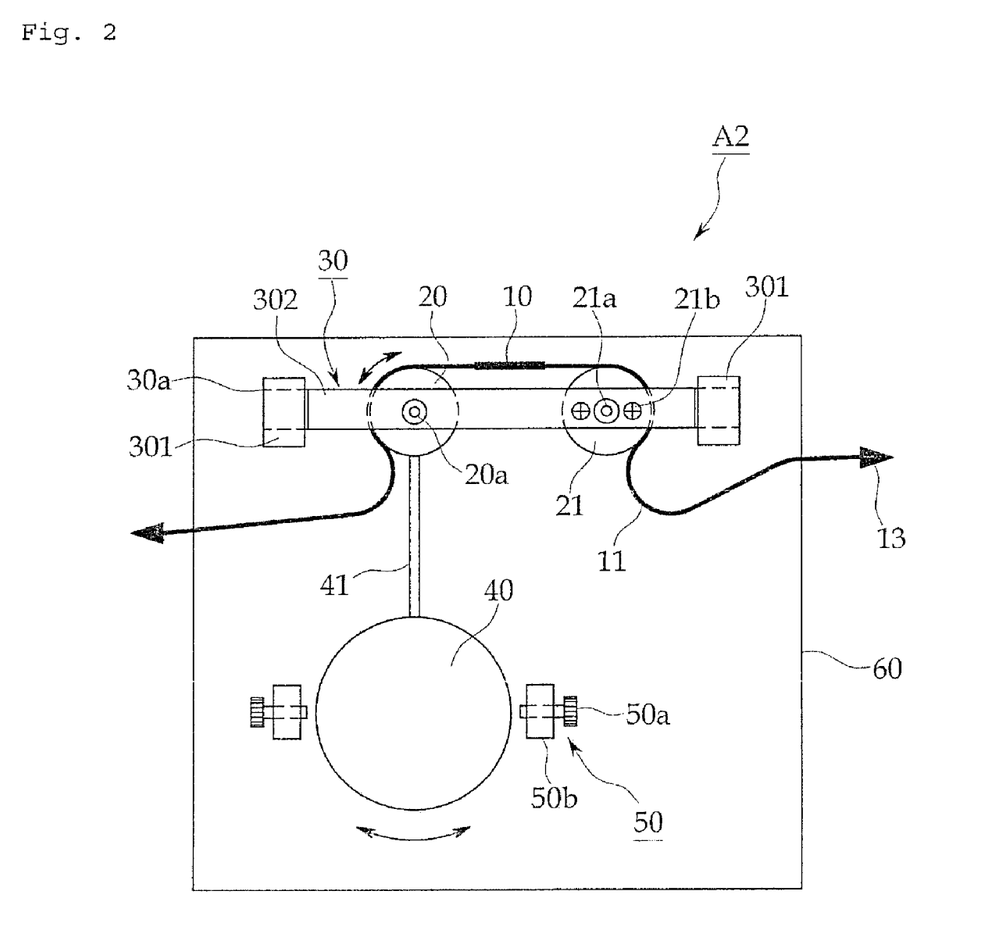
FIG. 2 is a view illustrating an apparatus for measuring convergence using a fiber Bragg grating sensor in accordance with a second embodiment of the present invention.
Figure 3:
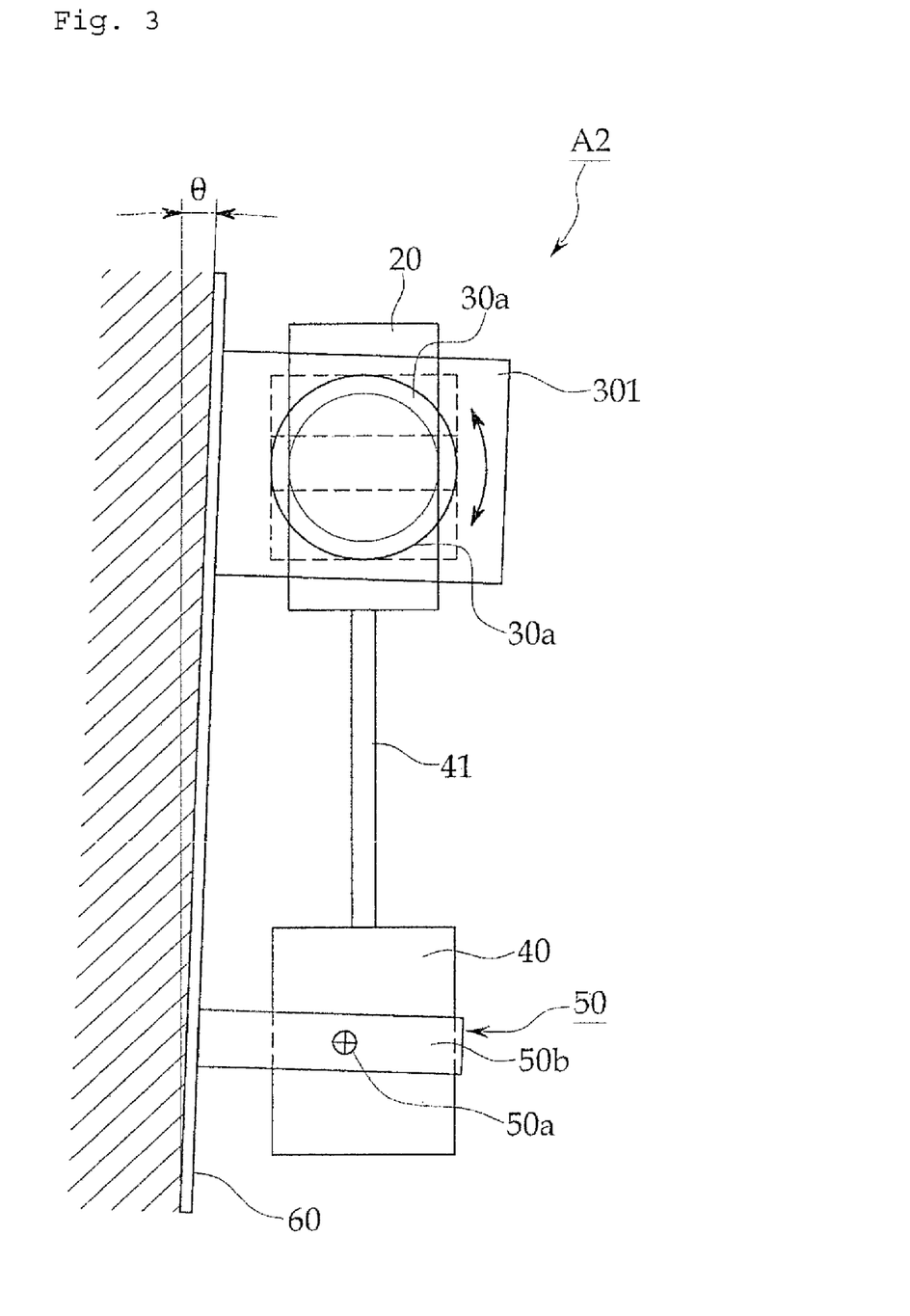
FIG. 3 is a left side view illustrating an operation of the apparatus of FIG. 2.

FIG. 2 is a view illustrating an apparatus for measuring convergence using a fiber Bragg grating sensor in accordance with a second embodiment of the present invention. FIG. 3 is a left side view illustrating an operation of the apparatus of FIG. 2.

Referring to FIGS. 2 and 3, an apparatus A2 for measuring convergence using a fiber Bragg grating sensor in accordance with a second embodiment of the present invention is installed on a measurement target, and thereby functions to measure a value of angular displacement caused by deformation of the measurement target. To this end, the apparatus A2 is characterized in that a posture corrector 30 is installed such that, in the case in which the measurement target has an inclined surface rather than a vertical surface, and particularly has an inclined angle at which an upper portion of the measurement target protrudes in a forward direction, a rotator rotates by itself in correspondence with a slope of the measurement target so as to guarantee precise operation, and thus the rotator 20, a fixture 21, and a bob 40 can always maintain a posture perpendicular to the ground.

As for the configuration of the apparatus A2 according to the second embodiment, the apparatus A2 includes a main body 60 that is installed on the measurement target, a posture corrector 30 that has a plurality of supports 301 spaced apart from each other at the front of the main body 60 in a horizontal direction and a horizontal bar 302 coupled rotatably to the plurality of supports 301 via a bearing, a fixture 21 that is fixedly installed on one inner side of the horizontal bar 302, a rotator 20 that is rotatably installed on the other inner side of the horizontal bar 302, an optical fiber 11 that is adhered to upper outer surfaces of the fixture 21 and the rotator 20 so as to maintain a horizontally tensioned state and has optical terminals installed on opposite ends thereof, a fiber Bragg grating sensor 10 that is installed on the optical fiber 11 between the fixture 21 and the rotator 20, and a bob 40 that is vertically connected with a lower portion of the rotator 20 by means of a support 41 having a predetermined length.

The posture corrector 30 includes the plurality of supports or brackets 301 that is horizontally spaced apart from the front of the main body 60, and the horizontal bar 302 coupled rotatably to the plurality of supports or brackets 301 via a bearing.

As illustrated in FIG. 3, in the case of installing the main body 60 to the measurement target inclined at a predetermined angle θ, the horizontal bar 302 of the posture corrector 30 rotates in proportion to the angle θ, the rotator 20, the fixture 21, and the bob 40 can always be maintained perpendicular to the ground, and thereby the rotator 20 can be prevented from being deflected from a shaft 20a thereof. The posture corrector 30 can guarantee precise operation, and thus allows the measurement to be performed with higher precision.

According to the second embodiment of the present invention, the displacement adjusters 50 are installed at both sides of the bob 40, which will not be further described below.

According to the second embodiment of the present invention, the rotator 20 is installed at an inner surface of the horizontal bar 30, and the support 41 is fixed to the rotator 20. Then, the bob 40 is attached thereto.

The fixture 21 is installed apart from the rotator 20 by a predetermined distance, and the fiber Bragg grating sensor 10 is fixedly attached to the optical fiber 11 between the fixture 21 and the rotator 20.

At this time, after the fixture 21 is rotated to apply proper tensile force to the fiber Bragg grating sensor 10, at least one anti-rotation bolt 21b is screwed to prevent the fixture 21 from rotating.

Therefore, when the measurement target, to which the main body 60 is attached, is rotated, the horizontal bar 302 coupled to the brackets 301 through the bearing 30a is rotated together with the measurement target, and thus the bob 40 rotates in a reverse direction.

At this time, the rotator 20 is rotated in cooperation with the support 41, thereby applying tensile force to the fiber Bragg grating sensor 10. Thus, the rotator 20 induces the fiber Bragg grating sensor 10 to be changed in length.

In other words, because the magnitude of the rotating force generated by the bob 40 is varied in proportion to a rotating angle of the horizontal bar 302, the tensile force of the fiber Bragg grating sensor 10 is detected by the fiber Bragg grating sensor 10, and then can be calculated in terms of the angle.

Therefore, according to the second embodiment of the present invention, because the horizontal bar 302 is coupled to the bracket 301 installed on the main body 60 via a bearing, the horizontal bar 302 can rotate in proportion to the inclination θ to perform automatic angle correction. So, precise angle measurement can be achieved and errors occurred during installation work can be adjusted.

Further, the displacement adjustors 50 are installed on opposite sides of the bob 40, thereby preventing the durability of the fiber Bragg grating sensor 10 from being lowered due to the displacement more than needed as described above. For the carrying, the adjusting bolts 50a are screwed to fix the bob 40, so that the breakage of the fiber Bragg grating sensor 10 is prevented.

A measurement method using the apparatus of measuring convergence using a fiber Bragg grating sensor according to the first and second embodiment of the present invention will be described below.

The measurement method includes a first step S1 of measuring a quantity of wavelength displacement of the fiber Bragg grating sensor 10 to set it as a reference value, a second step S2 of installing the main body 60 to a measurement target such as the wall of a tunnel, a third step S3 of measuring a value of the wavelength displacement resulting from expansion and contraction of the fiber Bragg grating sensor 10 by means of rotation of the bob 40 cooperating with the inclination of the measurement target caused by variation of the ground, and a fourth step S4 of substituting the wavelength displacement value measured in the third step S3 into the following equation to obtain angular displacement.

Here, the equation in the fourth step S4 is as follows. The angular displacement is obtained through Equation 1.

$$y = K \cdot x + b \qquad \text{Equation 1}$$

wherein y is the angular displacement, x is the wavelength displacement value, K is a coefficient and b is a constant.

Referring to FIG. 1, the coefficient K of Equation 1 is varied according to a ratio of a distance L between the center of the shaft 20*a* and the center of gravity of the bob 40 to a distance l between the center of the shaft 20*a* and a contact point of the optical fiber 11.

Further, the coefficient K of Equation 1 is varied according to a weight of the bob 40.

Figure 5:
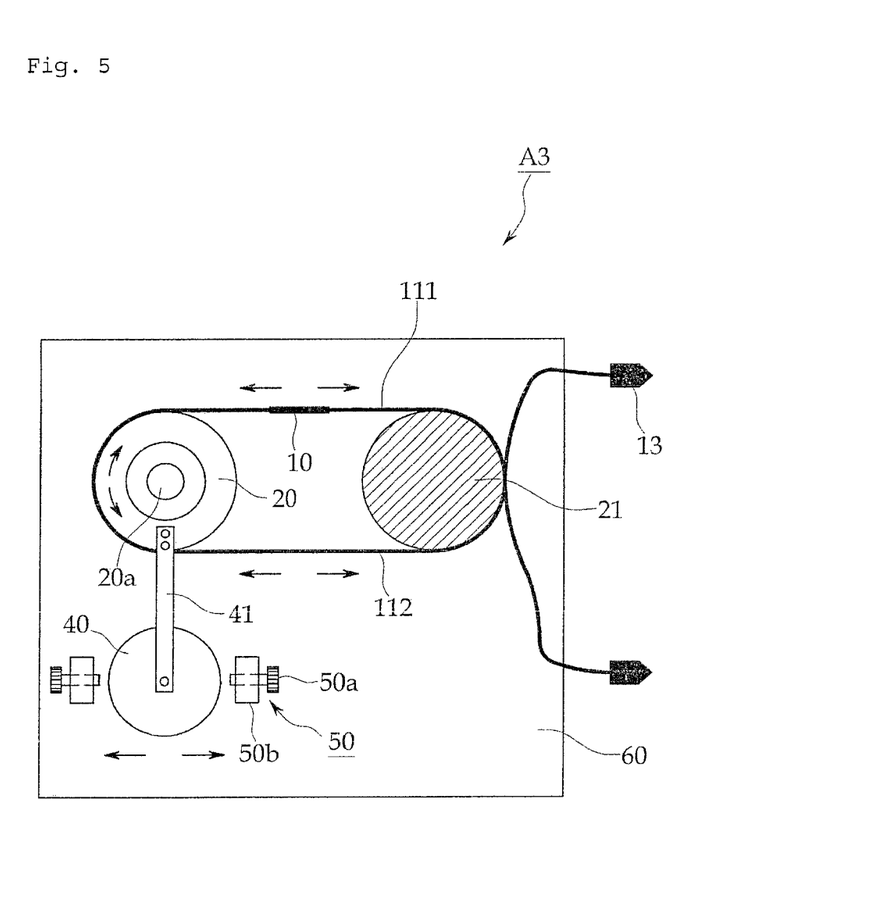
FIG. 5 is a view illustrating an apparatus for measuring convergence using a fiber Bragg grating sensor in accordance with a third embodiment of the present invention.
Figure 6:
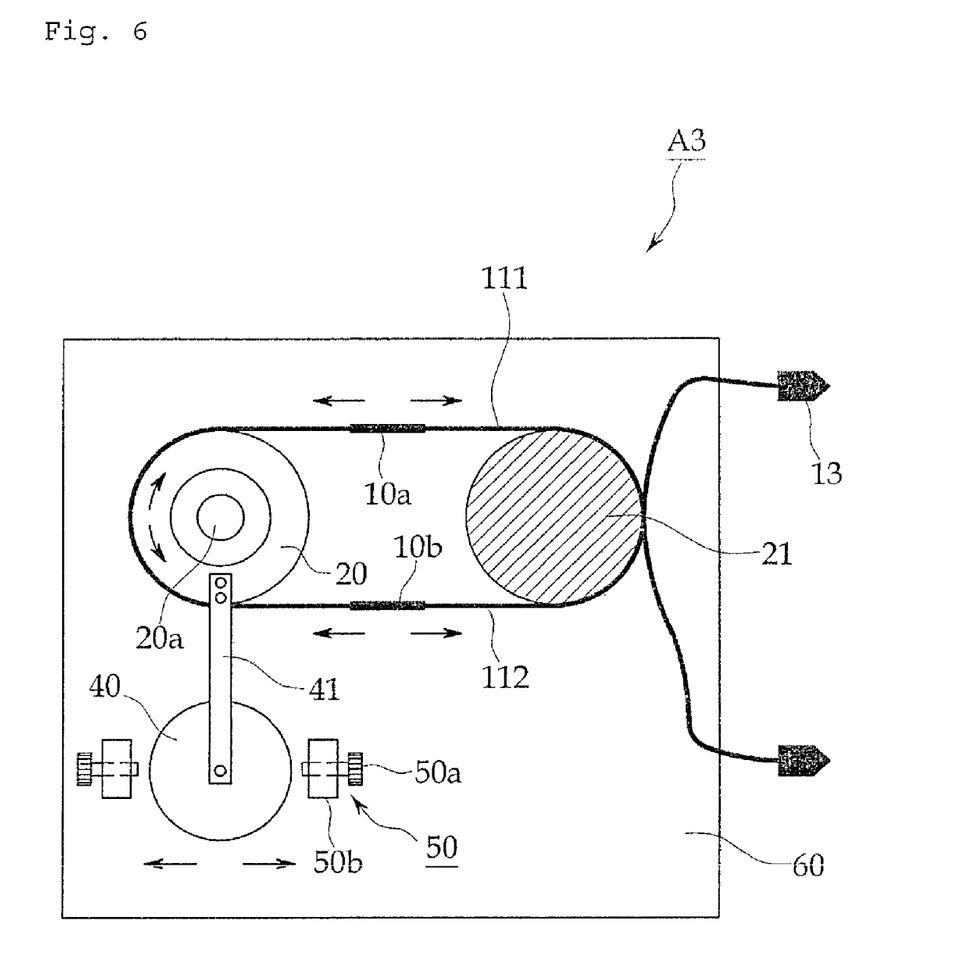
FIGS. 6 and 7 illustrate modifications of FIG. 5
Figure 7:
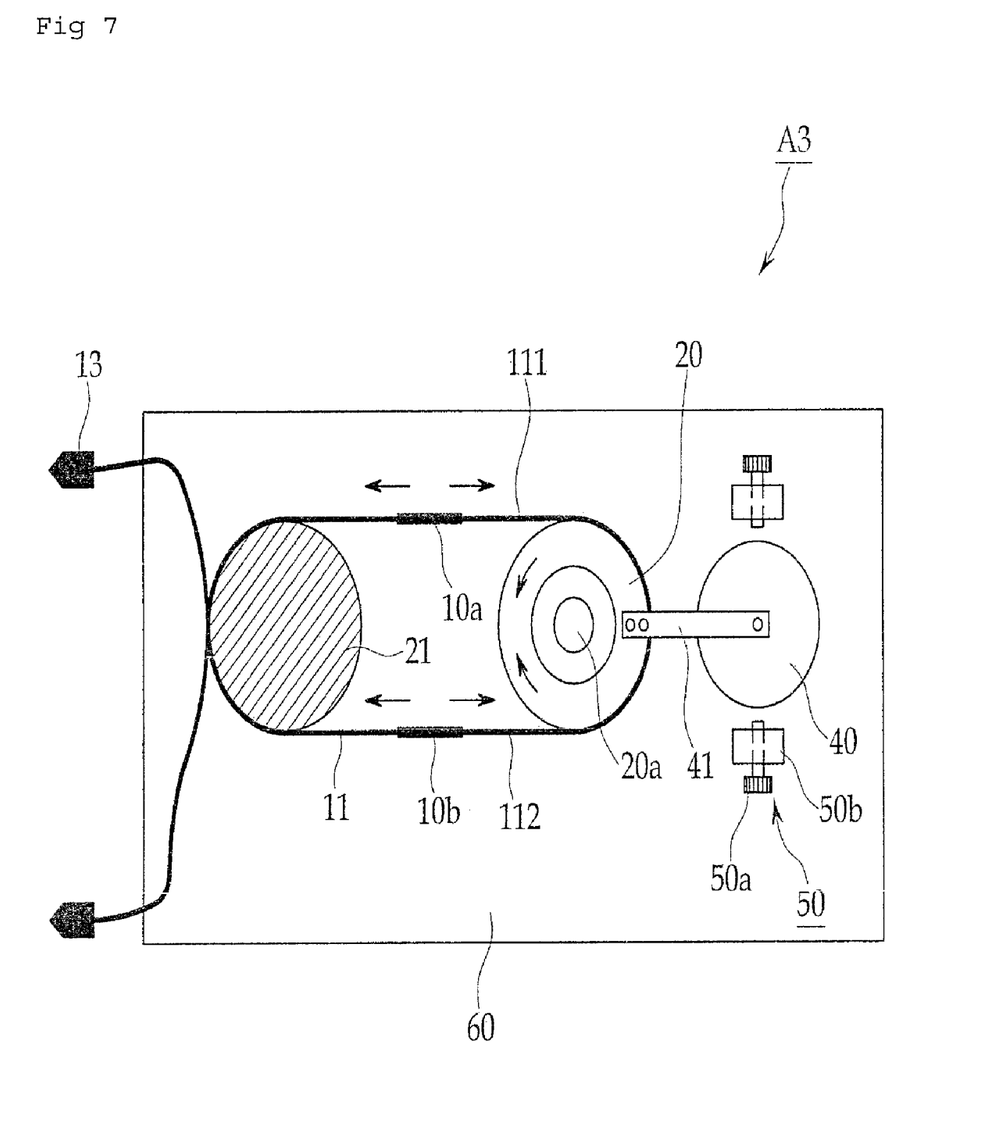

FIG. 5 is a view illustrating an apparatus for measuring convergence using a fiber Bragg grating sensor in accordance with a third embodiment of the present invention. FIGS. 6 and 7 illustrate modifications of FIG. 5.

Referring to FIG. 5, an apparatus A3 for measuring convergence using a fiber Bragg grating sensor in accordance with a third embodiment of the present invention is installed on a measurement target, and thereby functions to measure a variation value G of gravitational acceleration caused by vibration.

To this end, the apparatus A3 includes a main body 60 that is installed on the measurement target, a fixture 21 that is fixedly installed at the front of the main body 60, a rotator 20 that is horizontally installed apart from the fixture 21 at a predetermined distance and is rotatably installed in the main body 60 using a bearing, upper and lower optical fibers 111 and 112 that are adhered to upper and lower outer surfaces of the fixture 21 and the rotator 20 so as to maintain a horizontally tensioned state and each have an optical terminal 13 installed on one end thereof, a fiber Bragg grating sensor 10 that is installed on the upper optical fiber 111 between the fixture 21 and the rotator 20, and a bob 40 that is vertically connected with a lower portion of the rotator 20 by means of a support 41 having a predetermined length.

After being disposed to surround the fixture 21 and the rotator 20, the upper and lower optical fibers 111 and 112 are adhered to the upper and lower outer surfaces of the fixture 21 and the rotator 20 so as to maintain a horizontally tensioned state.

In the third embodiment of the present invention, the fixture 21 is installed at the front of the main body 60, and the rotator 20 is coupled to a shaft 20*a* that is spaced apart from the fixture 21. The rotator 20 and the shaft 20*a* are coupled to each other via a bearing, as described above.

A measurement method using the apparatus of measuring convergence using a fiber Bragg grating sensor in accordance with the third embodiment of the present invention will be described below.

The measurement method includes a first step S1 of rotating the main body 60 up to 90 degrees in a counterclockwise direction to contract the upper optical fiber 111 and simultaneously extend the lower optical fiber 112 by means of rotation of the bob 40, a second step S2 of measuring a quantity of wavelength displacement of the fiber Bragg grating sensor 10 in the first step S1 to set it as a reference value of gravitational acceleration G, a third step S3 of rotating the main body 60 up to 90 degrees in a clockwise direction to cause the bob 40 to return to its original position, a fourth step S4 of installing the main body 60 to a measurement target such as the wall of a tunnel, a fifth step S5 of measuring a value of the wavelength displacement resulting from expansion and contraction of the fiber Bragg grating sensor 10 by means of rotation of the bob 40 cooperating with the inclination of the measurement target caused by variation of the ground, and a sixth step S6 of substituting the wavelength displacement value measured in the fifth step S5 into the following equation to obtain tensile force g of the bob 40, and obtaining a varied gravitational acceleration G by comparing the obtained the displacement quantity with the reference value of the third step S3.

Here, the equation in the sixth step S6 is as follows. The gravitational acceleration G is obtained through Equation 2.

$$y = K \cdot x + b \qquad \text{Equation 2}$$

wherein y is the tensile force g of the bob, and x is the wavelength displacement value, K is a coefficient and b is a constant.

The coefficient K of Equation 2 is varied in accordance with a ratio of a distance L between the center of the shaft 20*a* and the center of gravity of the bob 40 to a distance l between the center of the shaft 20*a* and a contact point of the upper optical fiber 111.

Further, the coefficient of Equation 2 is varied in accordance with a weight of the bob 40.

At this time, as in FIG. 6, in the apparatus for measuring convergence using a fiber Bragg grating sensor in accordance with the third embodiment of the present invention, the upper and lower optical fibers 111 and 112 are provided with fiber Bragg grating sensors 10*a* and 10*b* respectively, so that tensile force and compression force are symmetrically applied to the upper and lower optical fibers 111 and 112. As a result, the measurement can be carried out with precision.

Further, any one of the upper and lower optical fibers 111 and 112 can be used for compensating for temperature.

Meanwhile, as illustrated in FIG. 7, the bob 40 can be horizontally connected to one side of the rotator 20 by means of the support 41 having a predetermined length. This horizontal connection of the bob 40 makes it easy to detect vertical vibration.

Figure 8:
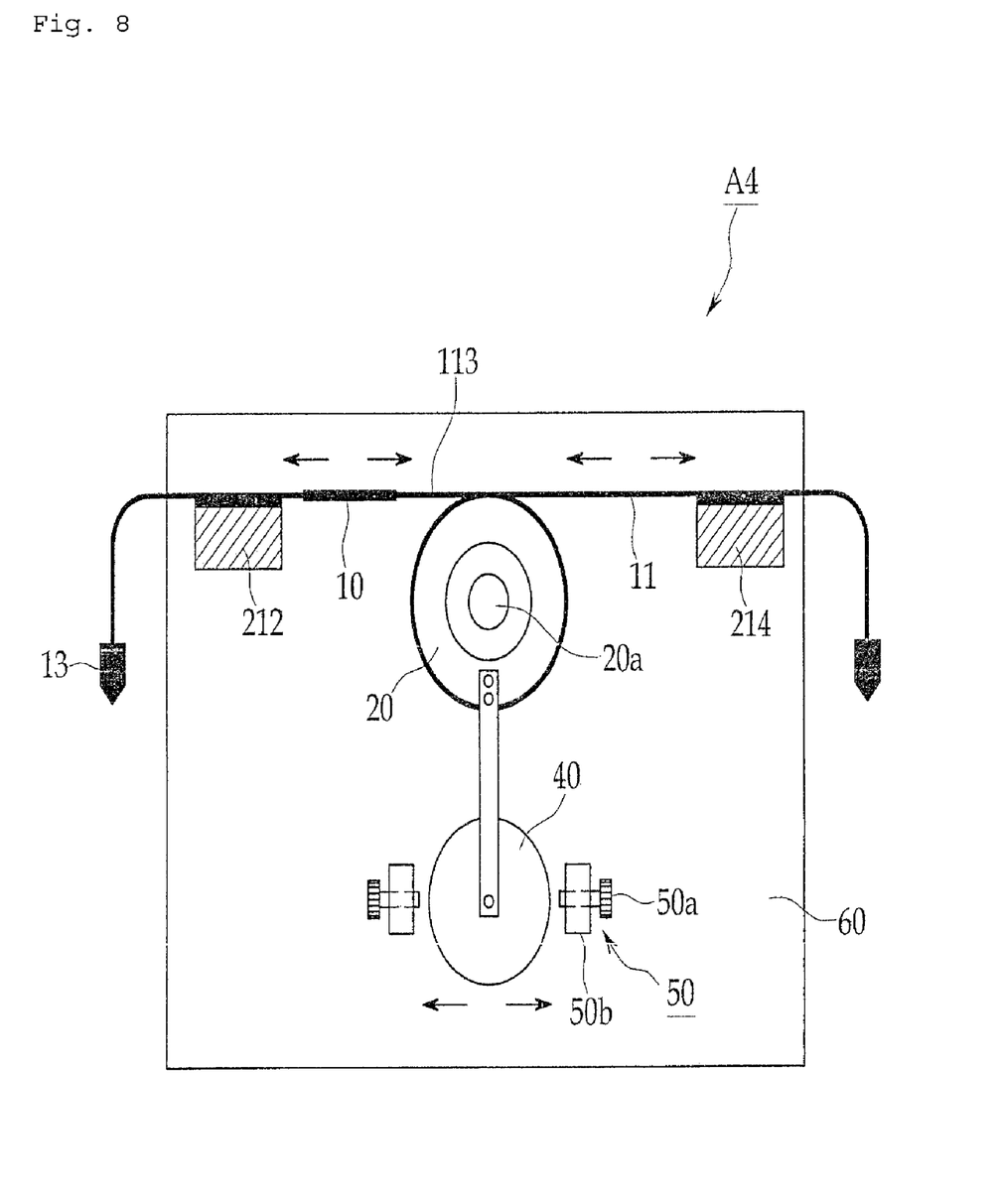
FIG. 8 is a view illustrating an apparatus for measuring convergence using a fiber Bragg grating sensor in accordance with a fourth embodiment of the present invention.

FIG. 8 illustrates an apparatus for measuring convergence using a fiber Bragg grating sensor in accordance with a fourth embodiment of the present invention.

Referring to FIG. 8, an apparatus A4 for measuring convergence using a fiber Bragg grating sensor in accordance with a fourth embodiment of the present invention functions to measure a deformation value of gravitational acceleration caused by vibration, and includes a main body 60 that is installed on the measurement target; a rotator 20 that is rotatably installed at the front of the main body 60 using a bearing; first and second fixtures 212 and 214 that are horizontally and fixedly installed apart from the rotator 20 at a predetermined distance; an optical fiber 11 that is wound around an outer circumferential surface of the rotator 20, and is adhered to the first fixture 212 on one side thereof and to the second fixture 214 on the other side thereof 20 so as to maintain a horizontally tensioned state, and has optical terminals 13 installed on opposite ends thereof; a fiber Bragg grating sensor 10 that is installed on the optical fiber 11 between the first fixture 212 and the rotator 20; and a bob 40 that is vertically connected with a lower portion of the rotator 20 by means of a support 41 having a predetermined length.

Figure 9:
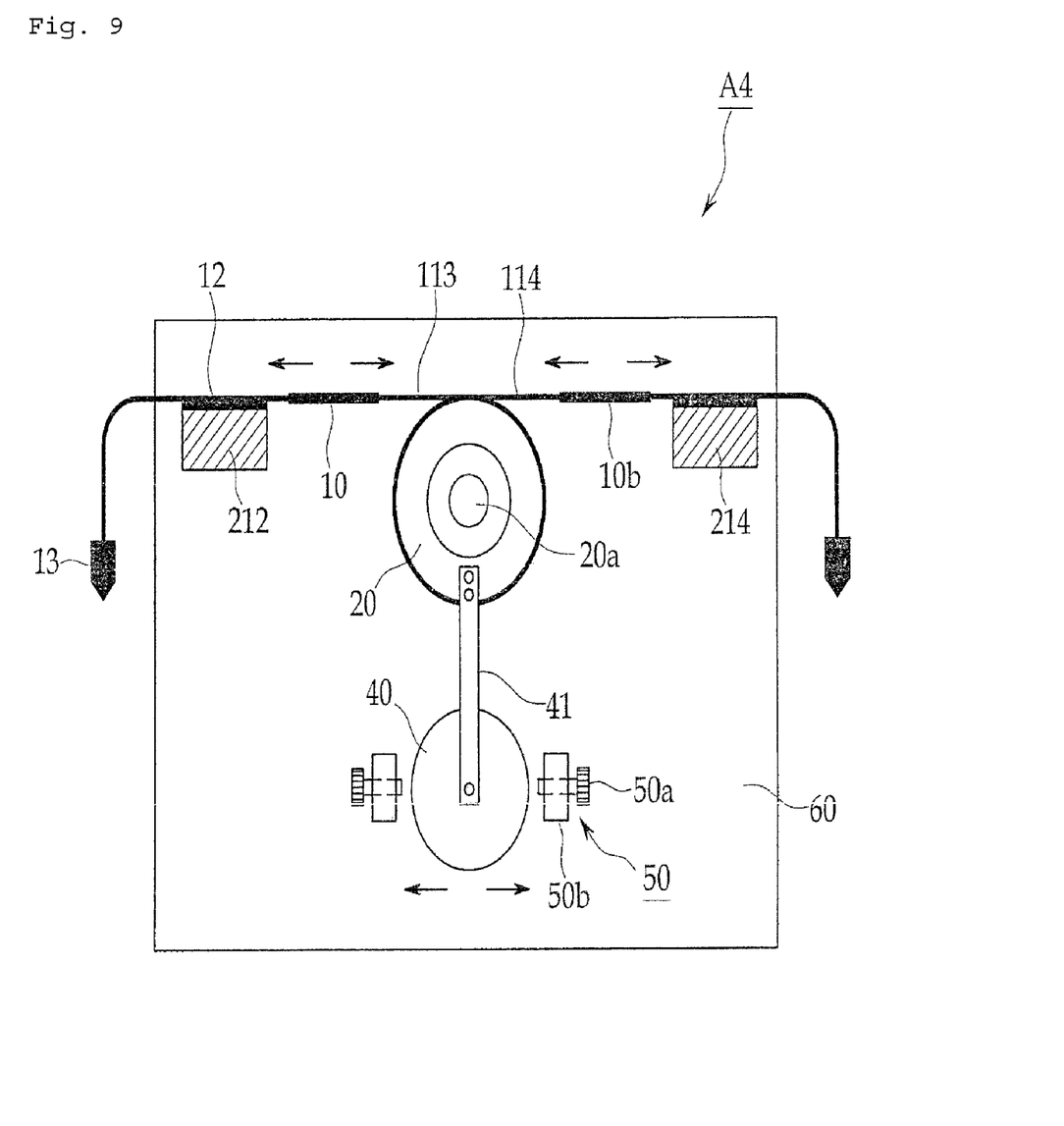
FIG. 9 illustrates a modification of FIG. 8.

FIG. 9 illustrates a modification, another embodiment, of FIG. 8. In the fourth embodiment of the present invention, another fiber Bragg grating sensor 10*b* is additionally installed on the optical fiber 114 between the second fixture 214 and the rotator 20.

The apparatuses A3 and A4 for measuring convergence using a fiber Bragg grating sensor in accordance with the third and fourth embodiments of the present invention can also be used for angular measurement.

Figure 10:
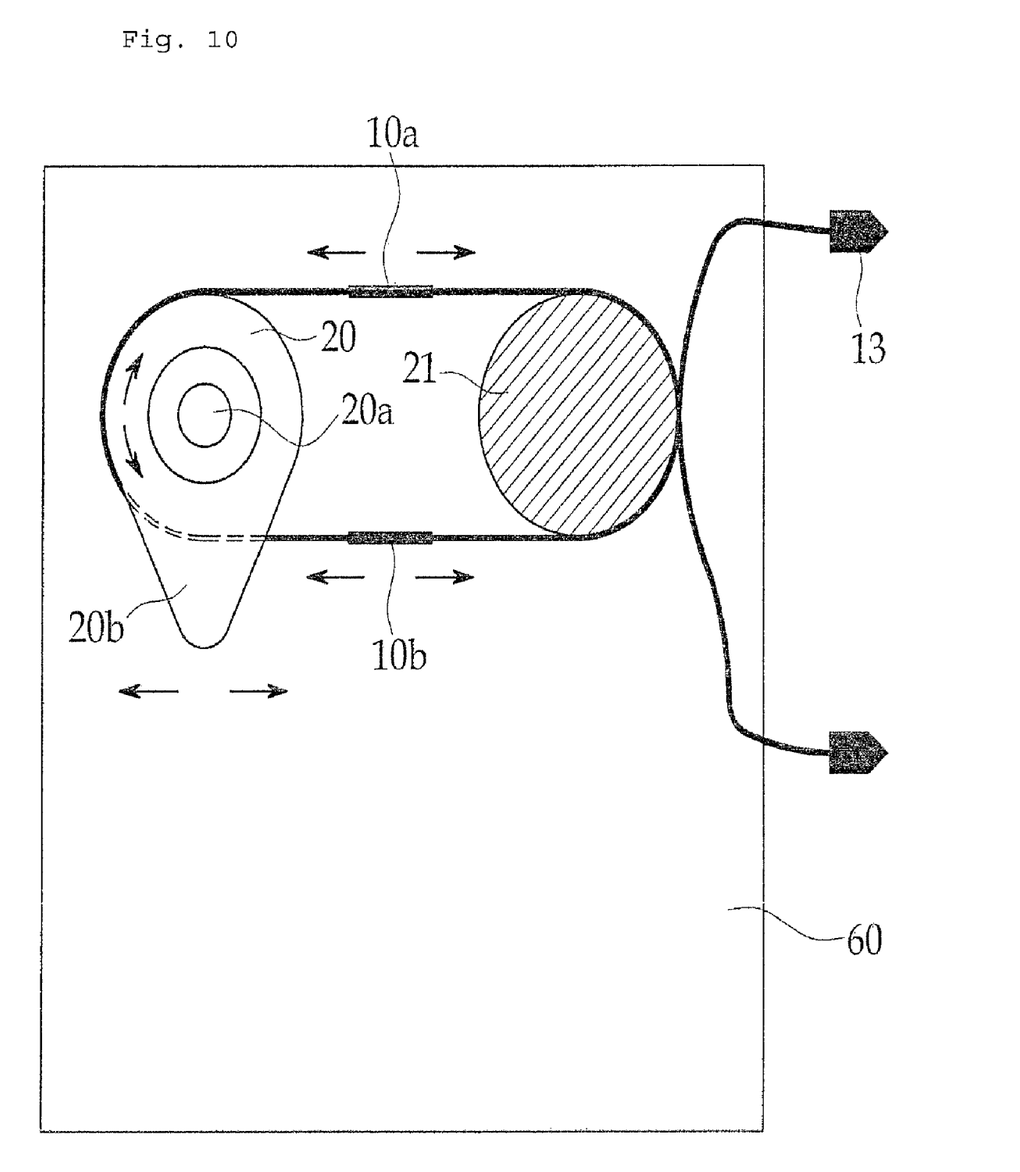
FIG. 10 illustrates an apparatus for measuring convergence using a fiber Bragg grating sensor in accordance with a fifth embodiment of the present invention.

FIG. 10 illustrates an apparatus for measuring convergence using a fiber Bragg grating sensor in accordance with a fifth embodiment of the present invention.

As illustrated in FIG. 10, in the apparatuses for measuring convergence using a fiber Bragg grating sensor in accordance with the first through fourth embodiments of the present invention, the rotator 20 is horizontally installed apart from the fixture 21 at a predetermined distance, is rotatably installed in the main body 60 using a bearing, and is eccentrically and integrally coupled with a weighting member 20b at a lower portion thereof.

INDUSTRIAL APPLICABILITY

As described above, according to the present invention, the tunnel convergence of the subway which has been difficult to measure while the subway is operated can always be measured by perfectly overcoming the influence of electromagnetic waves which is one of the disadvantages of the existing electric system. Further, the measurement precision can be increased due to good characteristics of the fiber Bragg grating sensor. Furthermore, because at least 20 sensors can be connected in series by a strand of optical fiber, a space far smaller than that of the existing electric system is required. In addition, because the fiber Bragg grating sensor itself has the specific wavelength value, the accumulated deformation in comparison with an initial value of the measurement target can be measured.

Although exemplary embodiments of the present invention have been described for illustrative purposes, those skilled in the art will appreciate that various modifications, additions and substitutions are possible, without departing from the scope and spirit of the invention as disclosed in the accompanying claims.

The invention claimed is:

1. An apparatus for measuring convergence using a fiber Bragg grating sensor, being installed on a measurement target and thereby making it possible to measure a value of angular and acceleration displacement caused by deformation of the measurement target, the apparatus comprising:
   a main body that is installed on the measurement target;
   a fixture that is fixedly installed at the front of the main body;
   a rotator that is horizontally installed apart from the fixture at a predetermined distance and is rotatably installed in the main body using a bearing;
   an optical fiber that is adhered to upper outer surfaces of the fixture and the rotator so as to maintain a horizontally tensioned state;
   a fiber Bragg grating sensor that is installed on the optical fiber between the fixture and the rotator; and
   a bob that is vertically connected with a lower portion of the rotator by means of a support having a predetermined length.

2. The apparatus as claimed in claim 1, further comprising a posture corrector that is installed at the front of the main body and rotates in cooperation with an inclination of the main body.

3. The apparatus as claimed in claim 2, wherein the posture corrector includes a plurality of brackets that are spaced apart from each other at the front of the main body in a horizontal direction, and a horizontal bar that is rotatably coupled to the plurality of brackets via a bearing.

4. The apparatus as claimed in claim 1, wherein upper and lower optical fibers are installed at lower outer surfaces of the fixture and the rotator.

5. The apparatus as claimed in claim 1, wherein the fiber Bragg grating sensor is installed at lower outer surfaces of the fixture and the rotator.

6. The apparatus as claimed in claim 1, wherein the rotator is eccentrically and integrally coupled with a weighting member at a lower portion thereof.

7. The apparatus as claimed in claim 1, wherein the main body includes a horizontal meter and a vertical meter installed outside thereof.

8. The apparatus as claimed in claim 1, further comprising displacement adjustors that are installed on opposite sides of the bob and serve to restrict amplitude of the bob or stop movement of the bob.

9. The apparatus as claimed in claim 8, wherein each of the displacement adjusters includes a body that is spaced apart from the bob by a predetermined distance, and an adjusting bolt that is screwed into the body and causes an end thereof to support the bob, so as to restrict a space where the bob can move by screwing or unscrewing the adjusting bolt.

10. A measurement method using a convergence measurement apparatus having a main body that is installed on a measurement target; a fixture that is fixedly installed at the front of the main body; a rotator that is horizontally installed apart from the fixture at a predetermined distance and is rotatably installed in the main body using a bearing; an optical fiber that is adhered to upper outer surfaces of the fixture and the rotator so as to maintain a horizontally tensioned state; a fiber Bragg grating sensor that is installed on the optical fiber between the fixture and the rotator; and a bob that is vertically connected with a lower portion of the rotator by means of a support having a predetermined length, the measurement method comprising:
   a first step of measuring a quantity of wavelength displacement of the fiber Bragg grating sensor to set the quantity of wavelength displacement as a reference value;
   a second step of installing the main body to the measurement target;
   a third step of measuring a value of the wavelength displacement resulting from expansion and contraction of the fiber Bragg grating sensor by means of rotation of the bob cooperating with an inclination of the measurement target caused by variation of the ground; and
   a fourth step of substituting the wavelength displacement value measured in the third step into an equation to obtain angular displacement.

11. A measurement method using a convergence measurement apparatus having a main body that is installed on a measurement target; a fixture that is fixedly installed at the front of the main body; a rotator that is horizontally installed apart from the fixture at a predetermined distance and is rotatably installed in the main body using a bearing; an optical fiber that is adhered to upper outer surfaces of the fixture and the rotator so as to maintain a horizontally tensioned state; a fiber Bragg grating sensor that is installed on the optical fiber between the fixture and the rotator; and a bob that is vertically connected with a lower portion of the rotator by means of a support having a predetermined length, the measurement method comprising:
   a first step of rotating the main body up to 90 degrees in a counterclockwise direction to contract the upper optical fiber and simultaneously extend the lower optical fiber by means of rotation of the bob;

a second step of measuring a quantity of wavelength displacement of the fiber Bragg grating sensor in the first step to set the quantity of wavelength displacement as a reference value of gravitational acceleration;

a third step of rotating the main body up to 90 degrees in a clockwise direction to cause the bob to return to its original position;

a fourth step of installing the main body to a measurement target;

a fifth step of measuring a value of the wavelength displacement of the fiber Bragg grating sensor by means of rotation of the bob cooperating with left-right vibration of the measurement target caused by variation of the ground; and a sixth step of substituting the wavelength displacement value measured in the fifth step S5 into an equation to obtain tensile force of the bob, and obtaining a varied gravitational acceleration by comparing the obtained the displacement quantity with the reference value of the third step.

* * * * *